(12) United States Patent
Esteve Rothenberg et al.

(10) Patent No.: US 8,824,474 B2
(45) Date of Patent: Sep. 2, 2014

(54) PACKET ROUTING IN A NETWORK (75) Inventors: Christian Esteve Rothenberg, Madrid (ES); Petri Jokkela, Espoo (FI); Pekka Nikander, Jorvas (FI); Mikko Särelä, Espoo (FI); Jukka Ylitalo, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 28 days.

(21) Appl. No.: 13/377,008

(22) PCT Filed: Oct. 1, 2009

(86) PCT No.: PCT/EP2009/062785
§ 371 (c)(1),
(2), (4) Date: Dec. 8, 2011

(87) PCT Pub. No.: WO2010/142354
PCT Pub. Date: Dec. 16, 2010

(65) Prior Publication Data
US 2012/0082163 A1 Apr. 5, 2012

Related U.S. Application Data

(60) Provisional application No. 61/185,395, filed on Jun. 9, 2009.

(51) Int. Cl.
*H04L 12/28* (2006.01)
*H04L 12/56* (2006.01)

(52) U.S. Cl.
CPC ............... *H04L 45/00* (2013.01); *H04L 45/34* (2013.01); *H04L 45/38* (2013.01); *H04L 45/302* (2013.01); *H04L 45/306* (2013.01)

USPC .......................................... 370/392; 709/238

(58) Field of Classification Search
CPC ............................ H04L 45/302; H04L 45/00
USPC .................... 370/392, 409; 709/238
See application file for complete search history.

(56) References Cited

U.S. PATENT DOCUMENTS

| 7,369,557 B1 | 5/2008 | Sinha | |
|---|---|---|---|
| 8,547,843 B2 * | 10/2013 | Roberts et al. | 370/235 |
| 2003/0002486 A1 * | 1/2003 | Emerson, III | 370/352 |

(Continued)

FOREIGN PATENT DOCUMENTS

WO    WO 2004/059923 A2    7/2004

OTHER PUBLICATIONS

Aad, Imad et al., "Packet Coding for Strong Anonymity in Ad Hoc Networks", *Securecomm and Workshops*, 2006, IEEE, Aug. 1, 2006, pp. 1-10.

(Continued)

*Primary Examiner* — Wei Zhao
(74) *Attorney, Agent, or Firm* — Myers Bigel Sibley & Sajovec, PA (57) ABSTRACT

Methods of providing packet routing information, according to various embodiments, may include encoding the packet routing information into a compact representation of set membership. The methods may include putting the compact representation of set membership into a header of a packet. Moreover, the methods may include computing the compact representation of set membership using input parameters that include at least one packet-specific, flow-specific or processing-context-specific parameter.

15 Claims, 4 Drawing Sheets

Calculating the node and packet based output value for the BF verification (56) References Cited

U.S. PATENT DOCUMENTS

2004/0190517 A1* 9/2004 Gupta et al. ............... 370/392
2007/0204350 A1* 8/2007 Juszkiewicz ............... 726/30
2008/0279133 A1* 11/2008 Bienfait et al. ............ 370/315

OTHER PUBLICATIONS

Esteve, Christian et al., "Self-routing Denial-of-Service Resistant Capabilities using In-packet Bloom Filters", 6 pages.
Esteve, Christian et al., "Self-routing Denial-of-Service Resistant Capabilities using In-packet Bloom Filters", 2009 *European Conference on Computer Network Defense,* Nov. 9-10, 2009, pp. 46-51.
Esteve, Christian et al., "Towards a new generation of information-oriented internetworking architectures", *RE-ARCH '08 SIGCOMM,* Dec. 9, 2008, Madrid, Spain, retrieved from the Internet Nov. 12, 2009: http://www.psirp.org/files/Deliverables/TowardsANewGenerationOfInformation-Oriented.pdf.
International Preliminary Report on Patentability Corresponding to International Application No. PCT/EP2009/062785; Date of Mailing: Aug. 16, 2011; 11 pages.
International Search Report and the Written Opinion Corresponding to International Application No. PCT/EP2009/062785; Date of mailing: Dec. 1, 2009; 15 pages.
Jokela Petri et al., "LIPSIN: Line Speed Publish/Subscribe Inter-Networking", PSIRP, Publish-Subscribe Internet Routing Paradigm, TR09-0001, Jan. 11, 2009.
Joseph, Dilip A. et al., "A Policy-aware Switching Layer for Data Centers", *SIGCOMM '08,* Aug. 17-22, 2008, Seattle, Washington, USA, pp. 51-62.
Wolf Tilman, "Data Path Credentials for High-Performance Capabilities-Based Networks", *ANCS '08,* Nov. 6-7, 2008, San Jose, CA, USA, pp. 129-130.
Written Opinion of the International Preliminary Examining Authority Corresponding to International Application No. PCT/EP2009/062785; Date of Mailing: Jul. 5, 2011; 9 pages.

* cited by examiner

Figure 1 Calculating the node and packet based output value for the BF verification

Figure 2

Figure 3 Forming a zFilter in Topology, verifying the filter in forwarding node

Figure 4 Forming a zFilter in Topology, verifying the filter in forwarding node

PACKET ROUTING IN A NETWORK

CROSS REFERENCE TO RELATED APPLICATIONS

This application is a 35 U.S.C. §371 national stage application of PCT International Application No. PCT/EP2009/062785, filed on 1 Oct. 2009, which claims the benefit of priority of U.S. Provisional Application No. 61/185,395, filed 9 Jun. 2009. The above-referenced PCT International Application was published in the English language as International Publication No. WO 2010/142354 on 16 Dec. 2010. The disclosures of both of the above referenced applications are hereby incorporated herein in their entireties by reference.

TECHNICAL FIELD

The present invention relates to packet forwarding in a network. In particular it relates to a method in which forwarding information is contained in a packet header so that a network node may determine along which link(s) the packet should be forwarded from the forwarding information in the packet header.

BACKGROUND

A Bloom filter is a well-known space-efficient data structure that answers set membership queries with some chance of false positives. In an attempt to solve many of the implementation constraints faced of next generation networks (e.g., Gbps speeds, increasingly complex tasks, larger systems, high-speed memory availability, etc.), the use of small Bloom filters in packet headers for different purposes (routing, security, accountability, etc.) has been proposed in PCT/EP 2008/061167, PCT/EP2008/063647 (hereinafter "[1]") and P. Jokela, A. Zahemszky, C. Esteve, S. Arianfar, and P. Nikander, "LIPSIN: Line speed publish/subscribe inter-networking", In ACM SIGCOMM, Barcelona, August, 2009 (hereinafter "[2]"). The key idea presented in these documents is a novel, space-and-computation-efficient source-routing and packet forwarding mechanism based on link identifiers and small Bloom Filters in packet headers.

In this document, we refer to the Bloom filters that are placed in the packet header, used in these type of applications, as an in-packet Bloom filters (iBF). In a way, an iBF follows a reverse approach compared to traditional BF-based approached previously described in the literature, for example by Broder and Mitzenmacher in Network Applications of Bloom Filters: A Survey. Internet Mathematics (2002) vol. 1 (4) pp. 485-509.

One application scenario, presented in [2], is a publish/subscribe-based network with an MPLS Path Computation Element (PCE) like topology layer that is able to determine source-routed paths. (Publish-Subscribe ("pubsub") oriented networking, as described by Mikko Särelä, Teemu Rinta-Aho, and Sasu Tarkoma in "RTFM: Publish/Subscribe Internetworking Architecture", published in the proceedings of ICT Mobile Summit, Stockholm, Jun. 11-13, 2008, focuses on data, as opposed to the original Internet Protocol which focuses on hosts and end points, as primary named entities. One idea behind the Publish-Subscribe paradigm is that one can avoid unwanted data delivery from one node to another. Using globally unique IP addresses, as in today's network, a sender can deliver a data packet to a host identified with an IP address without any explicit request from the receiver. This causes many problems, as it results in a user receiving unwanted, and even possibly malicious, data. This problem could be overcome by abandoning receiver-based addressing, such as used in the IP address scheme, as this removes the possibility of sending data to a destination host without the destination host having requested the data. Another scenario is an energy-efficient and secure replacement for the forwarding fabric in (G)MPLS or Carrier Ethernet.

In the field of data packet forwarding technologies, including IP forwarding, MPLS, and Carrier Ethernet, forwarding is based on the underlying assumption that the network shall always attempt to deliver packets to the destination named in the packet header, independent of who has placed the destination in the packet and where the packet is in the network. In MPLS, however, the situation is somewhat different since the label stack in the packet header works (usually) only at the designated path, as the labels may have different meanings on other paths. However, even in MPLS the network is agnostic to who has sent the packet, when the packet has been sent, and what the packet carries. In other words, the current networks do not provide any kind of protection at the network layer, or the protection provided is inconsequential and weak, as is the case with MPLS networks.

Another inherent security problem in forwarding is that the destination field in the packet header can be easily associated with the receiver. This, together with the potential predictability of other fields, makes traffic analysis relatively easy. In highly secure networks, such as military networks, it is essential to prevent traffic analysis. Today that is typically accomplished with link encryption, which is a relatively expensive operation.

In the field of in-packet Bloom Filters based forwarding, as described in [1-2], the situation is almost similar. There are no security methods to protect the receivers or the network from abuse of in-packet Bloom filters. First, without further considerations at how the iBFs are constructed, an iBF can be simply copied from one packet into another packet, and the resulting packet would be recognized as a legitimate one with respect to the state (elements) it carries.

Second, given two different packets that contain iBFs (as defined in [1]) with the same (or approximately the same) bit distribution, there is a leak of information since an observer can deduce that the same (or an overlapping) set of elements are present in the iBFs of the two different packets. Extending this threat, an attacker may wait and collect a large sample of iBFs to infer some common patterns of the inserted elements or even retrieve the element identities themselves. This, in turn, may allow both construction of forged iBFs and detailed traffic analysis.

Third, in case that an iBF gets compromised, i.e. an attacker has figured out how to construct valid iBFs, a victim is not able to detect and discard un-authorized iBFs nor do they have a way to re-establish the original (distributed) trust on the compromised iBF elements.

Specifically, in the field of forwarding data packets with in-packet Bloom filters, as in general also in other known forwarding methods, this lack of security is critical due to the risk of Distributed Denial of Service (DDoS) attacks, where a victim is flooded with traffic. For example, with an iBF source-routing-based solution, such as the one presented in [1-2], an iBF generated for a specific path is a valid forwarding identifier for all traffic using the same path. Thus, when an attacker obtains a valid iBF, the attacker can use it also for other data to deliver it to the original receiver. Hence, the routing approach based on compact representation of link identifiers is subject to an iBF replication attack. Moreover, there is a lack of native protection against DDoS attacks.

As another specific example, if an attacker can acquire a legitimate working iBF for a path that passes near the attacker and can simultaneously form an approximate iBF from the attacker's present location to the path, the attacker can construct a new iBF that allows it to inject traffic to the specified path, thereby allowing the attacker to flood the receiver with unwanted packets.

SUMMARY

A first aspect of the invention provides a network node for providing packet routing information. The node comprises means for encoding packet routing information of a route from a first node to one or more second nodes into a non-static compact representation of set membership, the compact representation of set membership being for inclusion into a header of a packet that is to be sent from the first node to the second node(s). The node is adapted to compute the compact representation of set membership using input parameters that include at least one packet-specific, flow-specific or processing-context-specific parameter.

In the method of [1] or [2], the iBF is generated based on the path from source to destination. Thus, all packets that follow that path have the same iBF, with the disadvantages explained above. In the present invention, however, the iBF (or other compact representation of set membership) is packet-dependent (so that packets transmitted along the same path will have different iBFs to one another) or is flow-dependent (so that packets of different flows will have different iBFs to one another, even if transmitted along the same path). This makes it harder for, for example, a potential attacker to obtain the information needed to mount a DDoS attack.

The network node may be adapted to encode the packet routing information by representing the packet routing information as a plurality of non-static identifiers (identifying elements, such as unidirectional links in [1-2]) and encoding the non-static identifiers into the compact representation of set membership.

The input parameters for generation of the compact representation of set membership include one of: a packet identifier, a flow identifier, a packet payload digest or a publication identifier.

The network node may be adapted to compute a compact representation of set membership that is time-dependent. For example the iBF (or other compact representation of set membership) may expire after a specified time so that, even if an attacker becomes aware of the iBF for, for example, a particular packet flow they will only be able to make use of this knowledge for a short time before the iBF expires.

The network node may be adapted to compute the compact representation of set membership using input parameters that include at least one predictable parameter from the processing context of the packet at a forwarding node.

The input parameters for generation of the compact representation of set membership include one or more bits from the header of the packet. For example, a packet header may contain one or more Quality of Service (QoS) bits that denote a QoS to which the packet is entitled, and these may be used as inputs. This has the advantage, firstly, that any packet that does not contain the correct QoS bits in his header will not be forwarded (as its iBF will not match) and, secondly, that the packet forwarding may take account of the QoS defined in the header.

A second aspect of the invention provides a network node for providing packet routing information. The node comprises: means for encoding packet routing information into a compact representation of set membership for inclusion into a header of a packet. The node is adapted to compute the compact representation of set membership using input parameters that include at least one predictable parameter from the processing context of the packet at a forwarding node.

The "processing context" of a packet at a forwarding node is defined by parameters such as the port number (or other identifier) of the input port at which the packet arrives at the forwarding node, the port number (or other identifier) of the output port by which the packet leaves at the forwarding node, the input or output radio channel by which the packet arrives at/leaves the forwarding node (in the case of wireless networks), the carrier wavelength (in the case of optical networks), the arrival time of the packet etc. Some of these parameters may be predictable in advance, and these are known as predictable parameters of the processing context. According to the second aspect of the invention, one or more predictable parameters of the processing context are used as input in the generation of the iBF (or other compact representation of set membership).

The second aspect may be used together with the first aspect. In principle this may not be necessary however, as the second aspect of the invention is, on its own, capable of providing increased security against attacks.

The input parameters may include an identifier of a port of the forwarding node at which the packet is predicted to arrive.

A third aspect of the invention provides a network node for providing packet routing information. The node comprises: means for representing packet routing information as a plurality of non-static identifiers for inclusion into a header of a packet. The node is adapted to compute the identifiers using input parameters that include at least one packet-specific, flow-specific or processing-context-specific parameter.

The packet routing information of the first, second or third aspect of the invention may be of a route from a first node to one or more second nodes, and the packet may be destined to be sent from the first node to the second node(s). The invention is not however limited to this, and the routing information may additionally or alternatively relate to routing a packet to various services available at a network node. A node may desire that a received packets visits services that are accessible from the node in a certain order—for example so that the packet initially visits a firewall service before visiting other services—and the present invention may be applied to this "internal routing" within a node as well as to routing between nodes.

The packet routing information of the first, second or third aspect of the invention may comprise a representation of a forwarding path or a forwarding tree from the first node to the second node(s)

A fourth aspect of the invention provides a network node comprising means for receiving a packet. The node further has means for computing one or more non-static identifiers, each identifier representing a potential routing decision, using at least one packet-specific, flow-specific or processing-context specific parameter; means for, for at least one computed identifier, comparing the computed identifier with routing information contained in the header of the packet to determine whether the potential routing decision should be made; and means for handling the packet on the basis of the determination.

The fourth aspect of the invention relates to the procedure at a forwarding node, when a packet having routing information encoded as a compact representation of set membership according to the first aspect, or having routing information according to the third aspect, is received. In essence, whereas [1] and [2] use fixed link identifier tags for generation of the iBF, the present invention may be considered as using link identifier tags that are not fixed but that depend on the packet, on the flow etc. A forwarding node is required to generate link identifier tags that correspond to those used in the initial generation of the iBF (or other compact representation of set membership) in order to forward the packet correctly.

The computed link identifier tag(s) may be time-dependent. Again, if an attacker becomes aware of a link identifier tag for a particular link they will only be able to make use of this knowledge for a short time before the link identifier tag changes.

One or more bits from the header of the packet may be used in computing the link identifier tag(s).

The method of the fourth aspect may further comprise determining a packet priority from the one or more bits from the header of the packet, and handling the packet may comprise handling the packet in accordance with the determined packet priority.

At least one predictable parameter from the processing context of the packet at the network node may be used in computing the link identifier tag(s).

A fifth aspect of the invention provides a network node comprising: means for receiving a packet. The node further has means for computing one or more identifiers, each identifier representing a potential routing decision, using at least one processing-context specific parameter; means for, for at least one computed identifier, comparing the computed identifier with routing information contained in the header of the packet to determine whether the potential routing decision should be made; and means for handling the packet on the basis of the determination.

The fifth aspect of the invention relates to the procedure at a forwarding node, when a packet having routing information encoded as a compact representation of set membership according to the second aspect is received.

An identifier of a port of the network node at which the packet is predicted to arrive may be used in computing the link identifier tag(s).

At least one of the computed identifier(s) may identify one or more links along which the packet is to be sent from the node and/or one or more nodes to which the packet is to be sent; and wherein the node may be adapted to handle the packet by forwarding the packet along the determined link(s) and/or to the determined other node(s).

The compact representation of set membership may be a Bloom filter.

Other aspects of the invention provide complementary methods.

A further aspect of the invention provides a computer-readable medium containing instructions that, when executed, cause a processor to perform a method of the invention.

As can be understood from the above, this invention relates to a data packet forwarding method where the forwarding identifiers in the packet headers work simultaneously as path designators, i.e. define which path the packet should take, and as capabilities, i.e. effectively allowing the forwarding nodes along the path to enforce a security policy where only an explicitly authorized packet is forwarded. In the presented approach the forwarding identifiers can be tightly bound to one or more of: the packet contents, the sender, the receiver(s), path(s) between the sender and the receivers, paths between different services accessible from a node, one or more "secure" bits in the packet header that can be used e.g. to securely signal QoS properties, and a time window.

The present invention is an extension of the methods described in PCT/EP 2008/061167 and in [1-2]. To briefly recap the approach presented previously, an iBF issuer selects a number of elements to be included into an iBF. The issuer constructs the iBF from the elements. The resulting iBF is then handed over to its user, which typically is a packet sender. The user then places the iBF into the packet header of a packet and sends it out to the network. When an iBF processing entity, typically a forwarding node in the network receives a packet containing an iBF, it compares the iBF with a list of pre-configured link identifiers. Whenever there is a match, the forwarding node forwards the packet along the associated output link. In that existing work, the iBF is a compact representation of a set of the pre-configured link identifiers.

One feature of the present invention is to construct the elements in the iBF computationally at the packet processing time, thereby binding the iBF to one or more of: an a-priori-known part of the packet or packet flow (e.g., a packet header identifier, the packet payload, flow identifier), a shared secret between the forwarding node and an iBF issuer (e.g., an MPLS PCE-like topology manager), one or more predictable parameters of the processing context at a forwarding node (such as the input port number at which a packet is expected to arrive at the forwarding node and/or the output port number by which a packet is expected to leave the forwarding node), and time. In the field of data packet forwarding, instead of using pre-configured link identifiers and link identifier tags, as was used in [1-2], the invention uses computationally generated link identifiers.

As one feature of the invention, there is provided a method for iBF construction/querying that makes the elements inserted into the iBF at the construction time flow- or packet-specific. Thereby, each specific iBF can be used only if used with the specified, authorized flow or packet. Hence, we mitigate the risk of iBF replay attacks, in which an iBF is placed into the headers of unauthorized packets, e.g. ones that belong to a different flow.

As another feature of the invention, there may be an approach of periodically updating a shared secret between the iBF issuers and the iBF processing entities. As a consequence, an issued iBF cannot be re-used after a certain period of time (an auto-expiration property) or upon an explicit re-keying request. This provides an effective countermeasure to protect the iBF networking application from replay attacks by authorized nodes.

For the specific case of using iBFs in a source-routing-based application, the method of [1-2] is extended with a method where there is a shared secret between a forwarding node and a topology system, wherein the secret is the output of a time-based pseudo-random function. The proposed shared-secret-based link-identification mechanism constitutes a novel network capability for protecting the network from DDoS attacks over time.

As a further feature of the invention, the iBF is bound to the desired network path (or paths) more tightly than in prior work. In particular, the iBF may depend strongly on one or more parameters of the processing context at a forwarding node, for example, on both the input and output ports at a forwarding node. (In a typical packet flow involving a packet passing through multiple forwarding nodes, the iBF may depend on one or more parameters of the processing context at some or all of the forwarding nodes.) As well as providing increased security, this feature of the invention allows the introduction of virtual, forwarding-node-internal services. That is, a packer can be passed internally within the node to a service, and once that service outputs the packet with using still the same, unchanged iBF, the node can forward the packet further without causing a forwarding loop, as would have been the case with the construction presented in [1-2].

A further advantage of the invention is that the forwarding nodes in the network each need only a very small forwarding table, for example a few tens or a couple of hundred bits, but are still able to make the forwarding decisions on a per-flow bases.

A further feature of the invention defines a method wherein the iBF is bound to a small number of "secure" bits in the packet header. As opposed to binding the iBF to a specific packet or a packet flow, this allows the forwarding node to securely check that the specific bits within the packet header have exactly the values that the iBF issuer has defined at the iBF construction time. For example, the "secure" bits in the packet can be used to designate specific QoS parameters. A certain bit pattern may designate "immediate forwarding", while another may designate "cache-and-forward". The presented method makes it infeasible for the packet sender to set these bits freely; instead, it is bound to use the specific values for the packet or flow.

A further advantage of the invention is that the iBFs of different packets, or of different packet flows, differ from each other to an extent that traffic analysis becomes practically impossible, at least beyond detecting packets belonging to the same flow. That is, given any two packets belonging to distinct flows, an attacker cannot tell whether they have been sent by the same party or whether they are destined to the same party or parties.

It is noteworthy that this aspect also makes correlation between iBFs computationally infeasible, thereby making it impossible in practice to construct new iBFs by analyzing a large number of working iBFs.

BRIEF DESCRIPTION OF THE DRAWINGS

Preferred embodiments of the present invention will be described by way of example with reference to the accompanying figures in which.

DETAILED DESCRIPTION

Preferred embodiments of the invention will be described in which packet routing information is contained in a Bloom Filter in the packet header (referred to as an "iBF"). The invention is not, however limited to this, and the routing information may be encoded into any compact representation of set membership although a Bloom filter or Bloom filter equivalent is preferably used. Indeed, in some embodiments of the invention packet routing information may be contained in the packet header without using a compact representation of set membership.

In general, in-packet Bloom filters (iBFs) are well suited for network applications where one needs to include a list of elements in every packet, but where a complete list requires too much space. From a security point of view, it is desirable that the values of the individual elements remain undisclosed.

For the sake of generality, we refer simply to elements as the objects being carried in an iBF and queried by the network processing entities according to the present invention. These elements take different forms depending of the specific network application to which the invention is applied, and an element may relate to, e.g., interface names, IP addresses, certificates, link IDs, etc. An element of an iBF may also be referred to as an "identifier", as it identifies, e.g. an interface, an IP address, a certificate, a network link, etc.

The basic notation of the iBF parameters is equivalent to the standard Bloom filter terminology: An iBF is a bit vector of length m. At the construction time, for every of the n elements to be included into the iBF, the issuer chooses k bit positions and sets them to "one" leaving all other bits as "zero". Similarly, to check whether an element is present in the iBF, the processing entity checks corresponding the k bit positions. If any of the chosen positions is equal to "zero", the processing entity can be sure that the element was not inserted into the iBF at the construction time (zero-false-negative property). If all the bits at the k bit positions are set to "one", we have a probabilistic argument to believe that the element was indeed inserted into the iBF at construction. However, there may be cases where bits set to "one" owing to insertion of other elements causes a non-inserted element to return true. This is referred to as a false positive.

Packet Forwarding with Dynamic Names

One feature of this invention consists in defining new way for an issuer to insert elements in an iBF at construction, and for the processing element to check membership at the processing time. One key point is to use a set of input parameters and a one-way function to construct the Bloom Filter friendly name of each element at the construction and verification time.

In general, the commonly used packet forwarding approaches are based on naming the destination nodes, or in the case of source routing, on naming the intermediate nodes the packet shall pass. The approach given in [1-2] deviates from this tradition by naming the links, not the nodes. In [1-2] nodes remain essentially anonymous or nameless.

In one embodiment of the present invention, we deviate even further from the prior approaches by essentially giving non-static identifiers to for, example, links. In [1-2] a link is given a static "link identifier tag" which, once generated, does not change. This link identifier tag is used for every packet that is required to be sent over that link, regardless of the packet's source, destination, flow or type. In the present invention, in contrast, a link is given a non-static identifier which may depend on one or more of: a packet-specific parameter, a flow-specific parameter or a processing-context-specific parameter. That is, instead of relying on a set of pre-defined names for each link, the present invention provides a "dynamic", context-dependent name to a link that depends on, for example, the packet contents, the path the packet is taking, or other parameters.

Hence, in the presented approach the forwarding decisions are based on a completely dynamic, computational approach where the iBF, the packet content, and optionally the processing context is used to computationally determine where the packet should be forwarded, if at all. The packet does not need to contain any identifiers naming its source or destination. Furthermore, the iBF fields in packets belonging to distinct flows are completely different, as the dynamic link identifiers are completely different between flows. Indeed, in embodiments in which a link is given a packet-dependent identifier, the link identifier differs between packets of the same flow. This makes it much harder for a potential attacker to introduce malicious packets for a DDoS attack.

Secured iBF Operations

In our approach, the k bit positions that are set to "one" at construction and checked for having the value "one" at processing, for example at a forwarding node, are chosen algorithmically both at the iBF construction time and at the iBF processing time. One novel aspect of this approach is that, at the packet processing time, the input parameters to the algorithm that chooses the k non-zero bit positions include at least one non-static input parameter. The parameters may include time-invariant elements (such as packet-dependent or flow-dependent elements) from the packet being processed, semi-static elements configured to a forwarding node, and dynamic elements determined by the context of wherein the packet came from and where it is to be forwarded to.

As long as the iBF issuer can predict the values that the input parameters used to generate the iBF will take at the packet processing time, the iBF issuer can compute the same k non-zero bit positions at the iBF issuing time as will be generated when the packet is processed. That is, as the iBF issuer knows the time-invariant value carried in the packet, i.e., a packet or flow identifier used to bind the iBF to a packet or flow, the semi-static value configured to the forwarding node (e.g. a shared secret key K), and the path that the packet is supposed to take, which determines the dynamic input values for the packet processing time, the iBF issuer can compute, at the construction time, the same k non-zero bit positions that the processing element will obtain at the processing time. Hence, the iBF can set those k bit positions to "one" in the iBF, causing the packet to match the forwarding criteria at the processing time.

Figure 2:
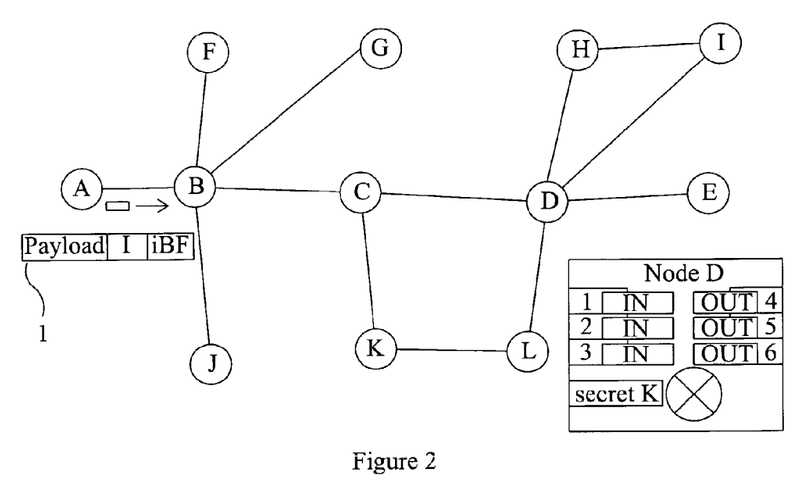
FIG. 2 is a schematic illustration of a network.

FIG. 2 is a schematic illustration of a network, showing nodes A-L. A packet is to be sent from node A along the paths A-B-C-K, A-B-C-D-E, A-B-C-D-H-I. Node D is thus one node that acts as a forwarding node, since it receives packets from node C, and forwards packets to nodes E and H (nodes B, C and H are also forwarding nodes). The packet routing information is to be contained in an iBF in the packet header, as described generally in [1-2]. The iBF is generated by an iBF issuer (not shown) for insertion in the headers of packet to be sent from node A. To apply the present invention, it is necessary that the iBF issuer can predict the values that the input parameters used to generate the iBF will take when the packet is processed at, for example, node D, to ensure that the packet is processed correctly at node D.

According to the invention the iBF for inclusion in packets to be sent from node A is generated using input parameters that include at least one packet-specific, flow-specific or processing-context-specific parameter. The iBF is therefore not invariant, as in [1-2], but will vary between packets of different flows (where the input parameters include a flow-specific specific parameter), between different packets (where the input parameters that include a packet-specific parameter), or between packets that are to be processed differently at a forward node such as node D (where the input parameters include a processing-context-specific parameter).

Figure 5:
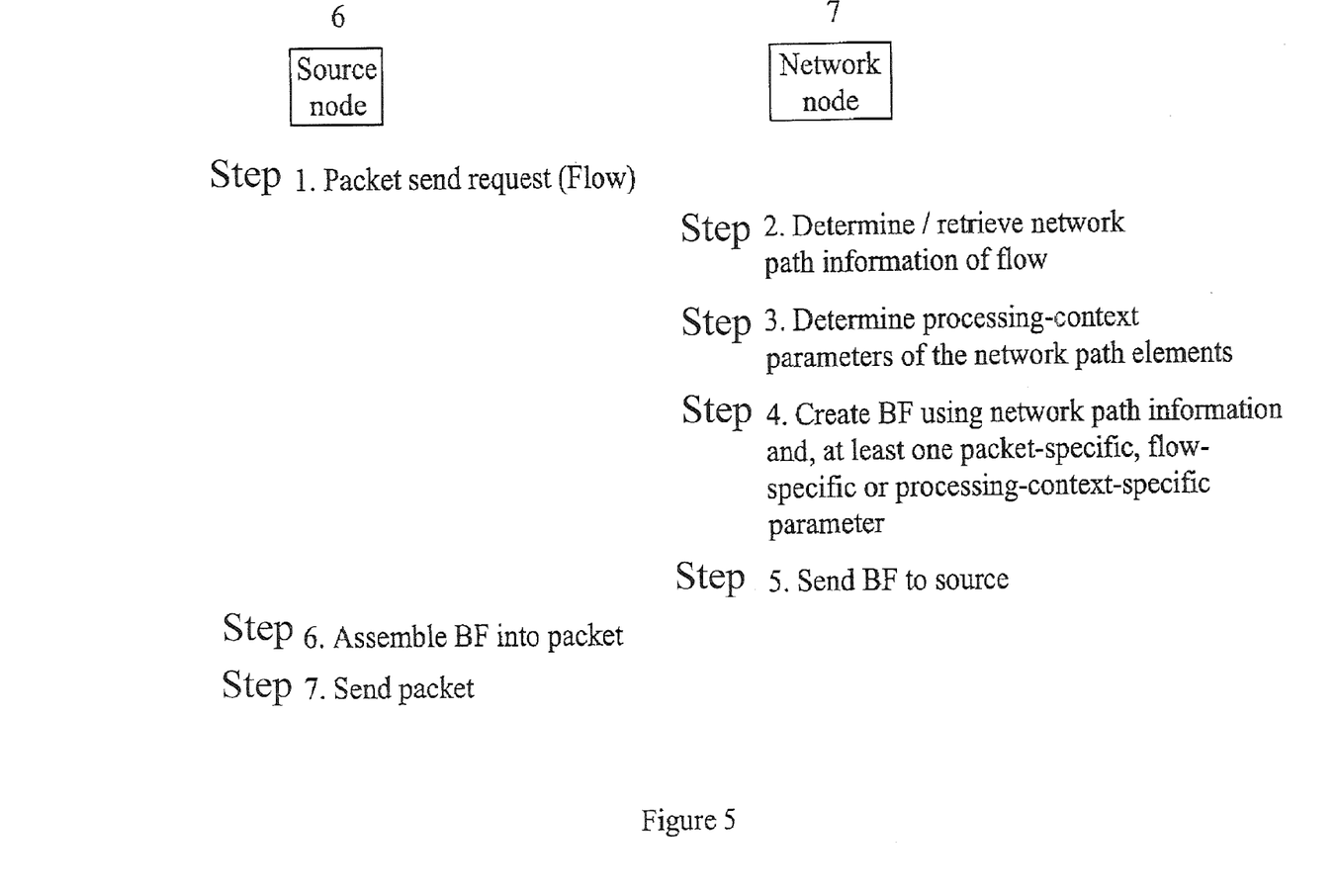
FIG. 5 illustrates the principal steps of a method according to an embodiment of the invention.

FIG. 5 is a flow diagram showing the principal steps of generating an iBF according to an embodiment of the present invention.

Initially at step 1 a source node 6 (for example node A of FIG. 2) that has to send one or more packets requests routing information for the packet flow. The request is made to another network node 7 (not shown in FIG. 2) that performs a routing function.

At step 2 the network node 7 determines or retrieves network path information for the packet flow. For the example of FIG. 2, this network path information would relate to the paths A-B-C-K, A-B-C-D-E, and A-B-C-D-H-I.

At step 3, the network node 7 determines processing context parameters of the nodes along the network paths. In the case of node D of FIG. 2, for example, the processing context might include one or more of the input port at which packets are expected to be received from node C, the output ports from which packets are expected to be forwarded to nodes E and H, the time at which the packet will arrive at node D (if this can be predicted), in the case of optical transmission the carrier wavelength, in the case of radio transmission the radio channel etc. This is repeated for each path, for each forwarding node in the path.

At step 4, the network node 7 determines an iBF. The input parameters used by the network node to computing the iBF include at least one packet-specific, flow-specific or processing-context-specific parameter. Examples of possible packet-specific or flow-specific parameters include: a packet identifier, a flow identifier, a packet payload digest or a publication identifier. The iBF also takes as input the desired network path determined at step 2. When the iBF is bound to a packet flow, the flow identifier may be sent by node A to node 7, or may be generated by node 7 and sent to A. When the iBF is bound to a single packet, node A may send a number of packet identifiers to node 7 as a group, or node 7 may generate a group of identifiers that it sends along with the iBF to node A, or node A and node 7 may agree upon an algorithm for generating packet identifiers—for example, in a pub/sub system there may be a TopicID (plus additional meta-data) from which a sequence of packet identifiers can be derived.

The network node 7 then returns the iBF to the source node A at step 5. The source node assembles the iBF into the packet at step 6, and transmits the packet at step 7.

A preferred embodiment generates the iBF using a one-way function F that takes three pieces of input: a secret key K shared between the iBF issuer and the processing element (e.g. node D), a packet or flow identifier I placed in the packet, and a context C defined by one or more predictable values from the processing context of the packet at node D. The processing context at a node includes values such as the input link (or input port) of the node over which the packet will arrive at the node, the output link(s) (or output port(s)) of the node over which the packet will be sent from the node, the time at which the packet will arrive at the node, in the case of optical transmission the carrier wavelength, in the case of radio transmission the radio channel, and perhaps other values. Some of these values may be predicted in advance and are hence "predictable parameters", and some may not be predictable in advance. In the example of node D of FIG. 2, the expected incoming link would be the link from node C, and the matching outgoing links are those that go to node E and node H. The links going to node I, node L, and back to node C would also be potential outgoing links, but those wouldn't match the routing information in the packet (unless there is a false positive). Hence, node D would (probably in parallel) consider all the pairs of <C, E>, <C, H>, <C, I>, and <C, L>.

Figure 1:
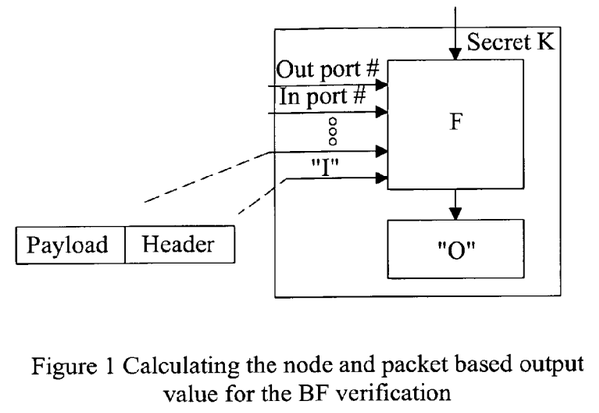
FIG. 1 illustrates calculation of an identifier according to an embodiment of the invention.

Hence, we assume a one-way function $$O = F(K, I, C) \qquad (1)$$

to choose the k bits that are set to "one" at the construction of the iBF, and that are checked for being "one" when the packet is processed (eg at node D). The input values are as follows: K is a secret shared between the iBF issuer and the iBF processing element. (In the example of FIG. 2, the secret K is shared between the iBF issuer and nodes B, C, K, D, E and H at which the packet is to be processed (node A does not need to know the secret when it is the sending host; if node A is a proxy for the sending host, node A may already know the first forwarding decision in which case node A again does not need to know the secret). (It should be noted that, rather than a single secret shared between the iBF issuer and nodes B, C, K, D, E and H, there may be separate secrets, for example a first secret K_B shared between the iBF issuer and node B, a second secret K_C shared between the iBF issuer and node C, etc.) I is a packet or flow identifier, carried in the packet. C is determined by the packet processing context at the processing element, typically including one or both of the input and output port identifiers, i.e. the index of the input port of the processing element at which the packet arrived at the processing element and the index of the output port of the processing element from which the packet might be forwarded. FIG. 1 is a schematic illustration of the one-way function O. The output O gives the k positions of the bits to be set to be "one" when the iBF is generated, and to be checked when the packet is processed (eg at node D).

The value I can be carried in the packet as an identifier, and FIG. 2 schematically shows the packet 1 as containing the iBF, the value I, and a payload. Alternatively, the value I may be derived from the packet content itself; for example, it may be a payload digest, an IP flow identifier, e.g. a hash of <IP_src, IP_dst, port_src, port_dst, protocol_id> (where IP_src/dst are the source and destination IP addresses, port_src/dst are the source and destination port identifiers, and protocol_id is the identifier of the protocol used), or a publication ID in a pure publish/subscribe network.

It is desirable for the function F to be fast and simple enough so that it can be computed in parallel, at the packet processing time, over the set of contexts checked by a packet processing element. For example, using a symmetric cipher, such as AES, using the key K as the cryptographic key and the context C as the initialization vector, may be used to encrypt the value I gives an output in a few clock cycles. It should be noted, however, that the invention is not limited to any specific function F. In general, the choice of the function F will be a compromise between security and processing time/cost. For example use of a full hash function as function F would provide very good security, but at the cost of relatively long processing times. Conversely, use of a simple linear function as F would lead to very short processing times, but would be less secure.

Figure 6:
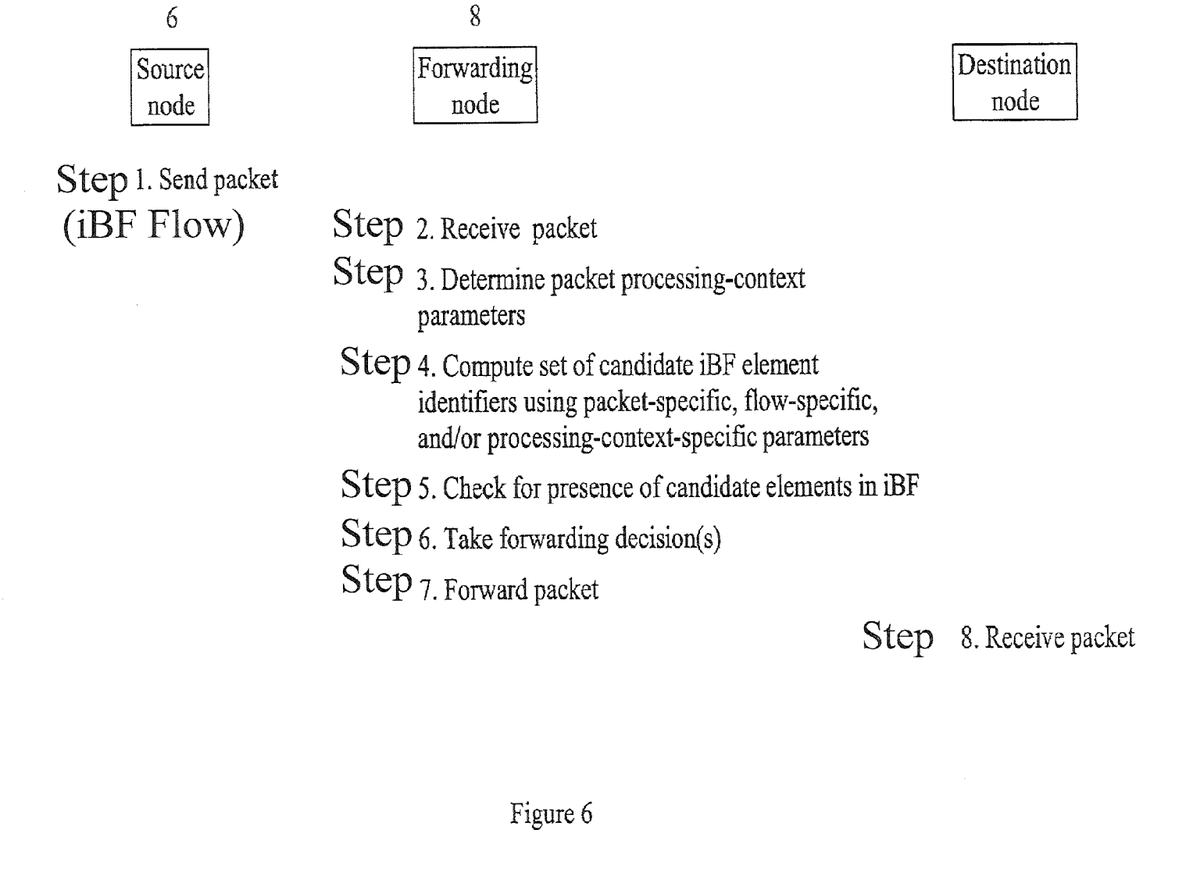
FIG. 6 illustrates the principal steps of a method according to an embodiment of the invention.

FIG. 6 illustrates the principal packet handling steps carried out at a forwarding node, for example node D of FIG. 2.

After the packet is sent from the source node 6 (eg node A of FIG. 2) shown as step 1 of FIG. 6 (corresponding to step 1 of FIG. 5) it is subsequently received at a forwarding node 8 (eg node D of FIG. 2), and this is shown as step 2 in FIG. 6.

At step 3, the forwarding node 8 determines one or more processing-context parameters for the packet. These may include one or more of the input port at which the packet was received at the forwarding node 8, the time at which the packet arrived at the forwarding node 8, in the case of optical transmission the carrier wavelength, in the case of radio transmission the radio channel etc.

At step 4, the forwarding node 8 determines a set of identifiers for an iBF. These identifiers are determined in the same way that the iBF was determined at the source node 6 in step 4 of FIG. 5, in that the same input parameters are used as were used at the source node and in that the identifiers are determined from the input parameters in the same way as at the source node. Each available output port (or node-internal port) of the forwarding node can be considered as a potential "routing decision" of the form "should the packet be forwarded along this output port"? Hence, the node preferably computes a distinct identifier, i.e. a distinct set of k bits set to "one", for each potential next hop processing unit, where a "next hop processing unit " is not limited to physical network interfaces but may also include internal node processes. (An example of an application of the invention to a node internal process is given below with regard to FIG. 4.)

At step 5, the forwarding node checks the identifiers determined at step 4 against the iBF in the received packet. Each identifier should have the form of an m-bit word of which k bits are set to "one" and all other bits are set to "zero", and step 5 consists of checking, for each determined identifier, whether the corresponding k bits in the iBF in the received packet are all set to "one".

At step 6, the forwarding node 8 takes a forwarding decision based on the results of step 5. If the result of step 5 is that, for an identifier, the corresponding k bits in the iBF in the received packet are all set to "one", then decision is made to forward the packet along the link, from the forwarding node, corresponding to that identifier. However, if the result of step 5 is that, for an identifier, the corresponding k bits in the iBF in the received packet are not all set to "one", then decision is made not to forward the packet along the link corresponding to that identifier. In the example of FIG. 2, node D would make the decision to forward the packet to nodes E and H, but not to nodes L and I (unless there is a false positive that causes the packet to be forwarded to one or both of nodes L and I).

At step 7, the forwarding node 8 forwards the packet along the links identified at step 6.

The packet is subsequently received at a further node 9. The method of FIG. 6 will be repeated at the further node 9—although, if node 9 is an ultimate destination node such as node E of FIG. 2, the method of FIG. 6 should not identify any links along which the packet is to be sent from node E and, unless there is a false positive, the packet will not be transmitted further from node 9 (although the packet may be routed to one or more services at node E as described with reference to "On-path Routing" below). Alternatively, node E. may know that is an end-node, and always assume that all arriving packets are destined to it.

It should be noted that advantages may be provided by binding the iBF to just a static processing context at a forwarding node, and not to a packet or packet flow. This iBF could be regarded as static (although the iBF may be made to have a finite lifetime), as it would apply to all packets received at the forwarding node that had that processing context. For example, if the iBF were tied to a particular input port at the forwarding node 7, all packets received at the forwarding node 7 at that input port would be processed according to that iBF, even packets belonging to different flows. To implement this embodiment, the iBF would be determined at step 4 of FIG. 5, and the identifiers would be determined at step 4 of FIG. 6, using a processing-context specific parameter, but not using a packet-dependent or flow dependent parameter.

[1-2] disclose a method in which a plurality of candidate iBFs may be calculated, with one of the candidates iBFs being selected for inclusion in the packet—for example the candidate iBF with the lowest probability of giving a false positive. This may be applied to the present invention, by modifying step 4 of FIG. 5 to determine a plurality of candidate iBFs, to include a selection of one of the candidate iBFs for inclusion in the packet, and to include placing in the packet an indication of which of the candidate iBFs has been selected. The method of FIG. 6 would then require the additional feature of the forwarding node 8 reading, from the received packet, the indication of which of the candidate iBFs has been selected and using this in the determination of the identifiers at step 4.

The methods of FIGS. 5 and 6 may be performed under computer control. For example, a suitable program may be stored on a computer-readable medium and used to control a processor to carry out a method of the invention.

Security-enhanced Source Routing

As noted, the invention may be applied in the context of the source-routing based data packet forwarding described in [1,2]. As explained above, the source-routing forwarding approach in [1,2] basically defines a set of Link ID Tags (LIT) per outgoing forwarding node interface, and constructs a forwarding identifier (FiD) by ORing the LITs on a network path. As the LIT values are in Bloom-filter-ready form (each LIT contains m-bits with only k bits set to 1), the resulting value is a Bloom filter that can be placed in the packet header. When the invention is applied to this, the invariant LITs (and hence invariant IBFs) of [1-2] are replaced by non-static link identifiers and hence by non-static iBFs As noted, the invention may be implemented by replacing the multiple LITs per interface with a single secret K, which may be unique either per node or per interface. A further advantage of this is the possibility of reducing the size of the forwarding table down to a few tens or hundreds of bits, as it now can require only a single value K instead of multiple Link ID Tags as defined in [1,2].

In a further embodiment of the invention, the secret K used in equation (1) may be generated with a pseudo random function K=F(seed, t). The seed value must be known by the forwarding node (the iBF processing element) and the topology system (the iBF issuer). Both of them maintain loose clock synchronization. An advantage of the approach is that it requires very little signaling between forwarding and topology nodes after the seeds have been distributed. In this embodiment, an iBF is also time-dependent, in that the iBF has a finite lifetime. This further improves security, since an attacker who became aware of an iBF would be able to use this information for only a short time, after which the iBF would "expire" and packets containing that iBF would not be forwarded through the network.

Security-enhanced Forwarding Decisions

Figure 3:
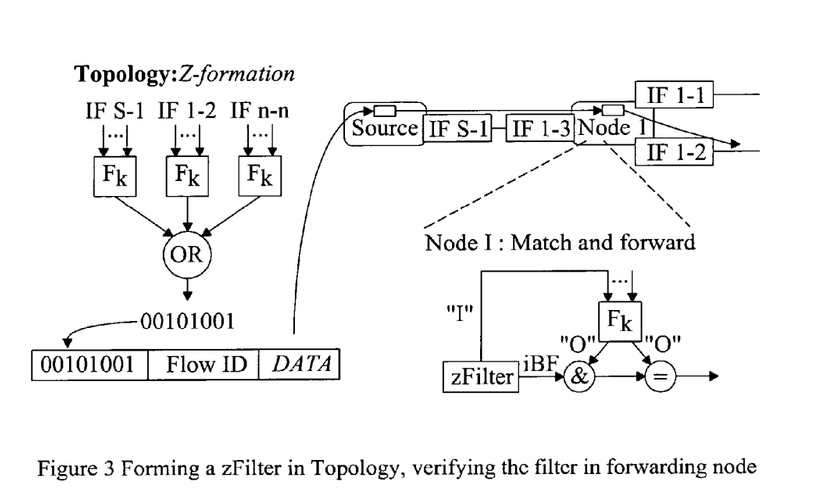
FIG. 3 is a schematic illustration of the formation of a filter.

In a further embodiment of the invention, the RID (Rendezvous ID) carried in a packet [1,2] or the IP flow designator 5-tuple is used as the packet or flow-identifier I (see FIG. 3). Thereby, an attacker cannot use the iBF with a different RID or with different IP addresses or TCP/UDP ports than originally used to compute the iBF. Moreover, the validity of a public-key-based RID may be verified with a digital signature algorithm. Alternatively, a RID may be formed by computing a digest over the payload using a one-way algorithm.

On the left-hand side of FIG. 3, the Topology: Z-formation diagram illustrates the computation of the iBF by applying a Function (Fk) per each forwarding hop (denoted as S-1, 1-2 etc). In addition to flow-specific information, each Fk uses forwarding-context-specific parameters of the output interface. The resulting bit string is assembled into the iBF packet header later referred to as zFilter. The packet is shown schematically as 1. The right-hand part of FIG. 3 shows the operations at a forwarding node, when the packet is received, to take forwarding decisions based on matching the outcome of their own Fk with the received, zFilter-labeled packet In a further embodiment of the invention, we define the context C of equation (1) to consist, for a node, of the pair <#in, #out>, where #in is the index of incoming interface at that node and #out is the index of outgoing interface at that node. The per-packet input I consists in this case of the pair <RID, d>, where RID is the per-packet or per-flow identifier and d is a small integer, carried in the packets, used to have multiple candidate representations to optimize the filling rate of the iBF; see P. Jokela, A. Zahemszky, C. Esteve, S. Arianfar, and P. Nikander, "LIPSIN: Line speed publish/subscribe inter-networking", In ACM SIGCOMM, Barcelona, August, 2009. (In brief, a set of candidate iBFs are generated, and one is selected for use, for example the one with the lowest probability of giving false positives; the integer d is used to identify the selected candidate iBF).

At the iBF processing time, a forwarding node that receives over the input interface #in a packet containing the values <d, RID> and the iBF value, evaluates the function F(K, <RID, d>, <#in, #out>), for each output link #out and for every K currently valid at the output link (bearing in mind that K may be time-dependent as mentioned above). The output of F( ) is always a set of k bit positions, and these k bit positions are checked in the iBF value FID to see if they all are set to 1. In case that all the k bits are set to 1, the packet is forwarded along the matching interface #out. If one or more of the k bits is not set to 1, the packet is not forwarded along that interface.

This approach binds the iBF tightly to the path in question. If a third party tries to send packets with the specific iBF value so that they arrive at any forwarding node at the path through some other input interface, the generated k bit positions will differ; consequently, the packet will get forwarded only if there is a false positive match.

On-path Services

The invention has so far been described with reference to routing packets through a network, from one node to another. The invention is not however limited to this, and may additionally or alternatively be applied to internal routing to on-path services accessible from a node. In data centers and other enterprise networks, it is often required that the packet visits certain on-path services in a predetermined order. Another requirement is that the order of the visited services can be changed easily. In Joseph, D. A., Tavakoli, A., Stoica, I, "A Policy-aware Switching Layer for Data Centers", SIGCOMM 2008, a new forwarding node design, called pSwitch, was presented. That used incoming MAC addresses and interface indices to determine the next-hop service for processing incoming packets. Hence, in that design forwarding could be performed in a certain, predefined order within a single node, instead of requiring physically or logically separate nodes for the services on the path.

To implement on-path services using the present invention, it is possible to construct iBFs that visit on-path services in a certain order within a single iBF-based forwarding node. With the original iBF design, as presented in [1,2], it was not possible to selectively forward a packet based on where it came from, as the packets were always forwarded to all matching outgoing interfaces. In the invention, however, by using the input interface index as an input value to the function F both during the iBF creation and processing time it becomes possible to determine the visiting order of the services within a single node.

Figure 4:
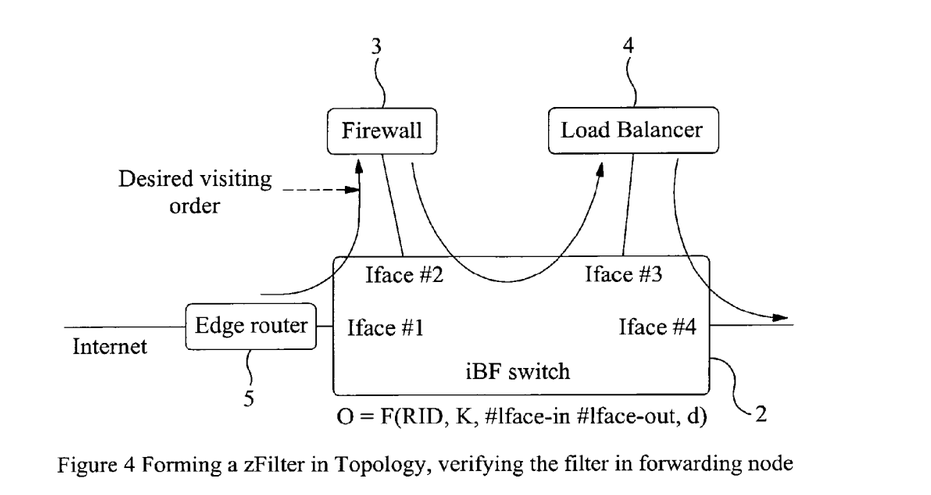
FIG. 4 is a schematic illustration of the formation of another filter.

For example, consider the structure show in FIG. 4, which displays a switching fabric 2 and a number of services accessible from the switching fabric 2. The services may all within a forwarding node or they may be implemented as separate nodes that are accessed from the forwarding node. When a packet arrives through a physical interface #1, eg via an edge router 5, the packet can be forced to traverse first to a first service (in this example a firewall service 3), and only when it arrives from the first service to be passed to a second service (in this example a load balancer service 4), etc.. That is, when the packet arrives at the switch fabric 2 through interface #1, the k bit positions computed for outgoing interfaces #3 and #4 would not result in a match with the iBF in the incoming packet header (unless there is a false positive). Instead, only the outgoing interface #2 would give a match, making the node pass the packet to the firewall service 3. (It should be noted that, when the firewall service 3 is within the forwarding node, the outgoing interface #2 can be considered as a "virtual interface", since interface #2 cannot be used to transmit packets from the forwarding node to another node.) On the other hand, once the packet arrives from the firewall service through interface #2, this time the k bit positions given by F(K, <RID, d>, <#2, #3>) will give a match, but not any other outgoing interface (ignoring the possibility of false positives)—so the packet will then be forwarded to the load balancer 4 via interface #3.

An advantage of this embodiment solution is that the iBF in the packet header does not need to be changed during packet traversal of the switching fabric 2 to ensure that the services are visited in the desired order. Moreover, it is very easy to redefine the on-path service visiting order at the iBF issuer node.

Using Control Information in the Packet Header

In a further embodiment of the present invention, there is described a method for securely using a number of "control bits" in the packet header for various operations at the forwarding nodes. By enforcing settings of the control bits in the packet header, the iBF issuer can securely "signal" to the forwarding nodes that some specific operation of set of operations needs to be performed on the passing packet or that a packet needs to be handled in a certain way (eg, handled according to a specified priority).

The control bits are a small number of bits present in the packet header, used as input parameters for the function F of equation (1), i.e. they are part of the packet-dependent input-parameter I. Consequently, they are protected against tampering: modifying a control bit will change the output from the function F, changing the positions of the k non-zero bits and thereby causing the forwarding node to drop the packet (unless there happens to be a false positive).

One practical example of the usage of these control bits is to define flow prioritization on forwarding nodes. That is, we can use this control information to securely provide differentiated transmission quality for certain traffic. When a packet arrives, with the control bits set to specify certain prioritization, and if the resulting output from the function F matches with one or more outgoing interfaces, the packet may receive differentiated treatment; for example, it may be transmitted from the forwarding node ahead of other potential packets that are queued for the same outgoing interface(s). With the presented mechanism, the forwarding nodes on the path do not have to be pre-configured to prioritize traffic, but the packet itself may contain the prioritization information in a tamperproof manner.

Another application for the control bits is to use them for better support for caching. Certain data could potentially gain from caching more than some other data, and this information can be delivered in the control bits.

As can be seen from the above description, the invention, through its various aspects, may provide the following advantages:

One aspect of the invention makes the iBF in the packets in a packet data network dependent on a packet-specific, flow-specific or processing-context-specific parameter, thereby making it infeasible to copy an iBF from one packet to another packet unless the parameter on which the iBF is dependent remains the same between the packets. A complementary aspect of the invention makes the forwarding identifiers in the packets in a packet data network dependent on a packet-specific, flow-specific or processing-context-specific parameter, thereby making it infeasible to copy forwarding identifiers from one packet to another packet unless the parameter on which the identifier is dependent remains the same between the packets. The iBF, or forwarding identifiers, are not fixed as in [1-2]. These aspects have the advantage of preventing many kinds of security threats present in current packet data networks, such as source address spoofing, control information tampering, etc.

The invention may also make the iBF, or the forwarding identifiers, in the packets in a packet data network time dependent, thereby making it infeasible to use expired forwarding identifiers. This aspect has the advantage of prevent the extension of any attacks that may result from an attacker misusing specific forwarding identifiers, forcing any potential attacker to periodically acquire new forwarding identifiers (by whatever means it acquired them in the first place). This has the advantage of raising the potential attacker's cost, making the attack scenario in question less lucrative.

A further aspect of the invention makes the iBF, or the forwarding identifiers, in the packets in a packet data network dependent on one or more predictable parameters of the processing context of the packet at a forwarding node, such as the specific path (or paths) the packet needs to take to get through the network from the sender to the receiver or receivers. This aspect has the advantage of making so-called traffic injection attacks infeasible. That is, the aspect raises the cost of any attackers on the packet path to a level where the presently known attacks become impossible in practice. Hence, this aspect has the advantage of making off-path attacks all but impossible.

As a separate advantage, the aspect of making the forwarding identifiers dependent of the details of the packet processing context has the advantage of making on-path services easy to implement. Within a single, stateless switching fabric the packet gets automatically forwarded differently depending on where it came from, allowing the packet to be passed to services and still pass the same switch several times without creating loops or other ill effects.

The invention allows one to build packet forwarding nodes that have a very small forwarding table of a few tens or hundreds of bits, that are able to make packet, time, and path dependent forwarding decisions in a secure way, where the amount of forwarding information in the packet is reasonably small, and where the packet processing decision is relatively simple, comparable to a single round with a symmetric cipher function. To our knowledge, this is the first time anyone has presented a forwarding method that has simultaneously the advantages of having 1) very small forwarding tables, 2) being able to differentiate forwarding decisions on a per-packet bases, 3) carrying only a reasonably small amount of control information in the packets, 4) having a reasonably simple forwarding decision, and 5) being secure from tampering.

The invention allows the packets to securely carry a small number of control bits in the packet header. These control bits may give the packets preferential treatment at the forwarding nodes. Being secure means that the sender cannot control the bits on its will, as changing the bits will require a change in the forwarding identifier to be placed into the packet.

The invention has been described above with reference to embodiments in which the identifiers relate to links of a network. The invention is not however limited to this. For example, an identifier may identify a network node rather than a network link. Alternatively, it may identify an pair of networks nodes (e.g. in a network where a link is shared between multiple nodes), identify a service, such as caching, that is to be performed within the node (after which the packet may or may not be again subject to the routing decisions as if it has just arrived at the node), it may identify some other means for forwarding the packet, such as a network address prefix or an administrative domain, or it may identify a set of network links. As further alternative, the identifiers may relate to (and be derived from) different levels of aggregation and naming forms, for instance, network domain names or network address prefixes. Other suitable identifiers can refer to services, e.g., middlebox services (firewalls, proxies) or higher level application identities (SIP Application Servers, Content Distribution Nodes, etc.).

The invention has been described above with reference to embodiments in which the routing information has been encoded into the packet header as an iBF or other compact representation of set membership. The invention is not however limited to this and the identifiers obtained by the invention may in principle be included directly in the packet header.

Abbreviations
iBF in-packet Bloom filter
BF Bloom filter
ID Identifier
Link ID link identifier
RID Rendezvous ID Definitions
seed A shared secret between an iBF issuer and processing entity.
K A key K, e.g., K=f(seed,t)
I A predictable part of the packet being processed, e.g. (IP_src, IP_dst, port_src, port_dst, protocol_id)
C A set of predictable characteristics of the packet processing context, such as the input and output port indices along the path that a packet is going to take.
F A one way function taking as its input the values K, I, and C, and giving as its output O, the k bit positions that need to be one in an iBF in order to give a match.
O the output from the function F, providing the k bits to be checked to be ones in an iBF

The invention claimed is:

1. A method of providing packet routing information, the method comprising:
    encoding the packet routing information into a non-static compact representation of set membership; and
    putting the non-static compact representation of set membership into a header of a packet,
    wherein input parameters to compute the non-static compact representation of set membership include a packet-specific parameter or a flow-specific parameter,
    wherein the packet-specific parameter comprises a parameter unique to the packet with respect to a path of the packet,
    wherein the flow-specific parameter comprises a parameter unique to a particular flow of the packet,
    wherein the packet comprises a first packet,
    wherein the non-static compact representation comprises a first non-static compact representation,
    wherein the header comprises a first header comprising the first non-static compact representation, and
    wherein the method further comprises:
        transmitting, from a source node, the first packet comprising the first header comprising the first non-static compact representation, along the path; and
        transmitting, from the source node, a second packet comprising a second header comprising a second non-static compact representation different from the first non-static compact representation, along the path.

2. The method as claimed in claim 1 wherein encoding the packet routing information comprises representing the packet routing information as a plurality of non-static identifiers, and encoding the non-static identifiers into the compact representation of set membership, 3. The method as claimed in claim 1 wherein the input parameters to compute the compact representation of set membership include one of: a packet identifier, a flow identifier, a packet payload digest or a publication identifier.

4. The method as claimed in claim 1 wherein the compact representation of set membership comprises a time-dependent expiration.

5. The method as claimed in claim 1 wherein the input parameters to compute the compact representation of set membership include at least one predictable parameter from a processing context of the packet at a forwarding node.

6. A method of providing packet routing information, the method comprising:
    representing the packet routing information of a route as a plurality of non-static identifiers; and
    including the non-static identifiers into a header of a packet,
    wherein input parameters to compute the non-static identifiers include a packet-specific parameter or a flow-specific parameter,
    wherein the packet-specific parameter comprises a parameter unique to the packet with respect to a path of the packet,
    wherein the flow-specific parameter comprises a parameter unique to a particular flow of the packet,
    wherein the packet comprises a first packet,
    wherein the non-static identifiers comprise first non-static identifiers,
    wherein the header comprises a first header comprising the first non-static identifiers, and
    wherein the method further comprises:
        transmitting, from a source node, the first packet comprising the first header comprising the first non-static identifiers, along the path; and
        transmitting, from the source node, a second packet comprising a second header comprising second non-static identifiers different from the first non-static identifiers, along the path.

7. The method as claimed in claim 6 wherein the routing information is of a route from a first node to one or more second nodes, and the packet is to be sent from the first node to the one or more second nodes.

8. The method as claimed in claim 7 wherein the packet routing information comprises a representation of a forwarding path or a forwarding tree from the first node to the one or more second nodes.

9. A method of routing a packet through a network, the method comprising:
    receiving the packet at a network node;
    computing one or more non-static identifiers, each identifier representing a potential routing decision, using at least a packet-specific parameter or a flow-specific parameter, wherein the packet-specific parameter comprises a parameter unique to the packet with respect to a path of the packet, and wherein the flow-specific parameter comprises a parameter unique to a particular flow of the packet;
    for at least one computed identifier, comparing the computed identifier with routing information contained in the header of the packet to determine whether the potential routing decision should be made; and
    handling the packet on the basis of the determination,
    wherein the packet comprises a first packet,
    wherein the one or more non-static identifiers comprise first one or more non-static identifiers,
    wherein the header comprises a first header comprising the first one or more non-static identifiers, and wherein the method further comprises:
   transmitting, from a source node, the first packet comprising the first header comprising the first one or more non-static identifiers, along the path; and
   transmitting, from the source node, a second packet comprising a second header comprising second one or more non-static identifiers different from the first one or more non-static identifiers, along the path.

10. The method as claimed in claim 9 wherein the at least one computed identifier comprises a time-dependent expiration.

11. The method as claimed in claim 9 wherein one or more bits from the header of the packet are used in computing the identifier(s).

12. The method as claimed in claim 11 and further comprising:
   determining a packet priority from the one or more bits from the header of the packet, and wherein handling the packet comprises handling the packet in accordance with the determined packet priority.

13. The method as claimed in claim 9 wherein at least one predictable parameter from a processing context of the packet at the network node is used in computing the identifier(s).

14. A non-transitory computer-readable medium containing instructions that, when executed, cause a processor to perform the method as defined in claim 9.

15. The method of claim 1, wherein:
   the input parameters include the flow-specific parameter;
   the particular flow of the first packet comprises a first flow; and
   the second packet corresponds to a second flow different from the first flow.

* * * * *